UNITED STATES PATENT OFFICE.

BERNHARD HEYMANN, OF ELBERFELD, GERMANY, ASSIGNOR TO THE FARBENFABRIKEN, VORMALS FR. BAYER & CO., OF SAME PLACE.

BLUE DYE.

SPECIFICATION forming part of Letters Patent No. 560,795, dated May 26, 1896.

Application filed July 3, 1895. Serial No. 554,864. (Specimens.) Patented in England March 4, 1893, No. 4,757; in France March 30, 1893, No. 227,675; in Italy March 31, 1893, XXVII, 33,839, and LXVI, 272, and in Austria-Hungary March 19, 1894, No. 44/1,954 and No. 28/852.

*To all whom it may concern:*

Be it known that I, BERNHARD HEYMANN, chemist, doctor of philosophy, and assignor to the FARBENFABRIKEN, VORMALS FR. BAYER & CO., of Elberfeld, Prussia, Germany, residing at the same place, have invented a new and useful Improvement in the Manufacture of Blue Coloring-Matters, (for which the aforesaid FARBENFABRIKEN, VORMALS FR. BAYER & CO. have already obtained Letters Patent in France, No. 227,675, dated March 30, 1893; in Italy, Vol. XXVII, No. 33,839, Vol. LXVI, No. 272, dated March 31, 1893; in Austria-Hungary, No. 44/1,954 and No. 28/852, dated March 19, 1894, and in England, No. 4,757, dated March 4, 1893;) and I do hereby declare the following to be an exact and clear description of my invention.

My invention relates to the production of new blue coloring-matters dyeing cotton and wool with the aid of mordants, and resulting by the action of the nitroso compounds of alkylated benzyl-anilin sulfo-acids on beta-naphthoquinonesulfo-acids (1:2:6 or 1:2:7) in the presence of thiosulfate. However, it is not necessary to employ the complete quinone-sulfo-acid, but I can also directly proceed from the corresponding nitrosonaphtholsulfo-acids, (1:2:6 or 1:2:7,) from which nitroso compounds the above-named naphthoquinone-sulfo-acids (1:2:6 or 1:2:7) can be obtained by reducing and subsequently oxidizing.

In carrying out my invention practically I can, for example, proceed as follows, without limiting myself to these particulars: Thirty-one kilos, by weight, of nitrosomethyl-benzylanilinsulfo-acid are dissolved in five hundred liters of hot water, with the addition of thirty-six kilos, by weight, of diluted acetic acid (containing thirty-three per cent. of pure acetic acid) and 13.6 kilos, by weight, of crystallized sodium acetate. The thus-obtained mixture is poured into a boiling solution prepared by dissolving fifty kilos, by weight, of sodium thiosulfate in one thousand liters of water. The reaction mixture is stirred until the yellow solution of the nitroso compound is no longer distinguishable—viz., until the nitroso compound has entered into reaction. The thus-obtained mixture is cooled down at about 60° centigrade and then mixed with 27.5 kilos, by weight, of the sodium salt of nitrosonaptholsulfo-acid, (1:2:6.) On continuous stirring and heating the reaction mixture at about 60° centigrade, the reaction mixture assumes a dull blue color. Finally seventy kilos, by weight, of common salt are added, and the mixture is boiled for about two hours. On cooling down the dyestuff separates in crystals, which are filtered off, pressed, and dried.

The same dyestuff can be obtained by replacing the 27.5 kilos, by weight, of the sodium salt of nitrosonaphtholsulfo-acid, by twenty-six kilos, by weight, of the sodium salt of naphthoquinonesulfo-acid, (1:2:6.)

The dyestuff obtained according to the directions given in the above example forms a dark powder with bronze-like luster.

According to the mode of preparation and the raw materials used and in accordance with the properties and reactions shown by the finished products the dyestuff has, probably, the following formula:

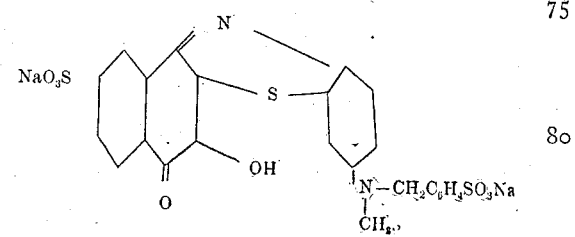

It dissolves easily in cold water, with a blue color. It is soluble with difficulty in alcohol. Ammonia forms a blue solution. Concentrated mineral acids—as, for example, sulfuric acid (66° Baumé) and hydrochloric acid (20° Baumé)—dissolve it with a green color, which turns into blue on the addition of ice-water to the acid solutions, bluish-violet flakes being finally precipitated. The same precipitate is formed when the watery solution of the dyestuff is mixed with diluted hydrochloric acid or sulfuric acid. It dyes wool and cotton mordanted with chromium salts in beautiful blue shades fast to light and milling, and it is likewise fit for printing purposes.

When in this application I refer to nitrosomethylbenzylanilinsulfo-acid I mean to include also its homologues, such as nitrosoethylbenzylanilinsulfo-acid.

Having now described my invention and in what manner the same is to be performed, what I claim as new, and desire to secure by Letters Patent, is—

1. The process for the production of blue coloring-matters resulting from the action of nitrosomethylbenzylanilinsulfo-acid with beta-naphthoquinonesulfo-acid (1:2:6, or 1:2:7) in the presence of sodium thiosulfate, substantially as described.

2. The process for the production of blue coloring-matters resulting from the action of nitrosomethylbenzylanilinsulfo-acid with the nitrosonaphtholsulfo-acid (1:2:6, or 1:2:7) which furnishes the corresponding beta-naphthoquinonesulfo-acid by reduction and subsequent oxidation in the presence of sodium thiosulfate, substantially as described.

3. As a new article of manufacture, the blue coloring-matter producible from the action of nitrosomethylbenzylanilinsulfo-acid and its homologues such as nitrosoethylbenzylanilinsulfo-acid on naphthoquinonesulfo-acid (1:2:6 or 1:2:7), in the presence of sodium thiosulfate, which dye, in case nitrosomethylbenzylanilinsulfo-acid and naphthoquinonesulfo-acid (1:2:6) be employed, has probably the following formula:

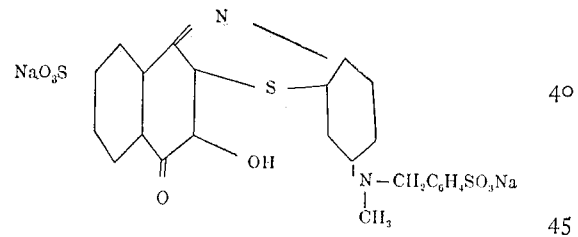

forming a dark powder with metallic luster, easily soluble in water with a blue color, soluble in alcohol with difficulty, soluble in concentrated sulfuric acid (66° Baumé) with a green color which turns into blue on the addition of ice-water to the sulfuric-acid solution bluish-violet flakes being finally precipitated, dyeing wool and cotton mordanted with chromium salts in beautiful blue shades fast to light and milling.

In testimony whereof I have signed my name in the presence of two subscribing witnesses.

BERNHARD HEYMANN.

Witnesses:
WILLIAM ESSENWEIN,
F. H. STRAUSS.